| (12) | United States Patent | (10) Patent No.: | US 10,324,411 B2 |
|---|---|---|---|
| | Sue | (45) Date of Patent: | Jun. 18, 2019 |

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Tomohiro Sue, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/096,017

(22) PCT Filed: Apr. 3, 2017

(86) PCT No.: PCT/JP2017/014007
§ 371 (c)(1),
(2) Date: Oct. 24, 2018

(87) PCT Pub. No.: WO2017/203843
PCT Pub. Date: Nov. 30, 2017

(65) Prior Publication Data
US 2019/0137926 A1 May 9, 2019

(30) Foreign Application Priority Data
May 25, 2016 (JP) ................................. 2016-104611

(51) Int. Cl.
*G03G 15/00* (2006.01)
*G03G 21/00* (2006.01)
(Continued)

(52) U.S. Cl.
CPC ............. *G03G 21/00* (2013.01); *G02B 26/10* (2013.01); *G03G 15/0409* (2013.01); *G03G 21/1666* (2013.01)

(58) Field of Classification Search
CPC .............. G03G 21/00; G03G 21/1666; G03G 15/04045; G03G 15/0409; G02B 26/10
See application file for complete search history.

(56) References Cited

U.S. PATENT DOCUMENTS

| 8,831,468 | B2 * | 9/2014 | Yuki | ...................... G03G 21/00 347/224 |
| 2015/0293493 | A1 * | 10/2015 | Sue | .................... G03G 15/0409 347/118 |
| 2015/0370065 | A1 | 12/2015 | Ozawa | |

FOREIGN PATENT DOCUMENTS

| JP | 2009-143108 | 7/2009 |
| JP | 2011-008184 | 1/2011 |

(Continued)

OTHER PUBLICATIONS

International Search Report dated Jun. 20, 2017 in International (PCT) Application No. PCT/JP2017/014007.

*Primary Examiner* — Hoang X Ngo
(74) *Attorney, Agent, or Firm* — Wenderoth, Lind & Ponack, L.L.P.

(57) ABSTRACT

An optical scanning device has a housing body and an upper lid. The upper lid is formed at the end part thereof with a plurality of engagement holes, the housing body is provided at the sidewall thereof with a plurality of upper lid engaging projecting parts that project outward from a housing and are engaged with the engagement holes, an input gear is held to an end part of one side or the other side of the upper lid in a predetermined direction, and the plurality of upper lid engaging projecting parts are formed such that amounts of projecting outward from the housing are increased as the plurality of upper lid engaging projecting parts are positioned at a side near the input gear in the predetermined direction.

3 Claims, 9 Drawing Sheets

(51) Int. Cl.
*G02B 26/10* (2006.01)
*G03G 15/04* (2006.01)
*G03G 21/16* (2006.01)

(56) References Cited

FOREIGN PATENT DOCUMENTS

| | | |
|---|---|---|
| JP | 2015-199278 | 11/2015 |
| JP | 2015-200853 | 11/2015 |
| JP | 2016-007745 | 1/2016 |

* cited by examiner

OPTICAL SCANNING DEVICE AND IMAGE FORMING APPARATUS INCLUDING THE SAME

TECHNICAL FIELD

The present invention relates to an optical scanning device and an image forming apparatus including the same.

BACKGROUND ART

An electrophotographic image forming apparatus such as a copy machine and a printer includes an optical scanning device that emits light for forming an electrostatic latent image on a photoreceptor (for example, see Patent Literature 1). The optical scanning device has a box-like housing body opened upward and an upper lid that closes an upper side of the housing body. The housing body receives optical devices such as a light source, a polygon mirror, and an image forming lens. The upper lid is formed with an opening for leading optical beams emitted from the light source to an outer side of the housing body. The opening has a rectangular shape extending in a predetermined direction (for example, a main scanning direction) and is covered by a transparent cover such as a dustproof glass.

The upper lid is provided on the upper surface thereof with a cleaning mechanism for cleaning the dustproof glass. The cleaning mechanism has a cleaning member that abuts the surface of the dustproof glass and a driving mechanism that reciprocally drives the cleaning member in the predetermined direction along the dustproof glass. The driving mechanism has a screw shaft extending in the predetermined direction along the dustproof glass and an input gear that inputs rotational driving force to the screw shaft. The input gear is held to the upper lid via the screw shaft. There are cases where the input gear is directly held to the upper lid.

An image forming apparatus body is provided therein with a driving gear meshed with the input gear. The driving gear is disposed to be meshed with the input gear from below when the housing body is set in a predetermined place of the image forming apparatus body from above. The driving gear is connected to a motor provided in the image forming apparatus body. Rotation of the motor is transferred to the screw shaft via the driving gear and the input gear. By so doing, the screw shaft is rotated, so that a holding member is reciprocally driven along the dustproof glass and thus the surface of the dustproof glass is cleaned by the cleaning member.

At both sidewalls of the housing body in the predetermined direction, engaging projecting parts are formed to project outward from the housing body. The upper lid has a body plate part having a rectangular plate shape and convex parts projecting downward from parts corresponding to the engaging projecting parts at each side of the body plate part. The convex part is formed with a rectangular engagement hole. When the upper lid is mounted at the hosing body, the engagement holes are engaged with the engaging projecting parts of the housing body, so that the upper lid is fixed to the housing body.

CITATION LIST

Patent Literature

Patent Literature 1: Japanese Unexamined Patent Application Publication No. 2016-007745

SUMMARY OF INVENTION

Technical Problem

However, in the optical scanning device disclosed in the Patent document 1, when the housing body is set in a predetermined place of the image forming apparatus body from above, the driving gear provided to the image forming apparatus body is meshed with the input gear from below. Therefore, there is a problem that the upper lid fixed to the housing body floats up by pressing force acting on the input gear from the driving gear, resulting in the occurrence of tooth skipping between both gears.

In this regard, it is considered to prevent floating-up of the upper lid by increasing the projecting amounts of the engaging projecting parts formed at the housing body and thus facilitating locking between the engagement holes formed in the upper lid and the engaging projecting parts.

However, when the projecting amounts of the engaging projecting parts are increased, there is a problem that mountability and demountability of the upper lid with respect to the housing body are deteriorated.

The present invention has been made to solve the aforementioned problems, and an object of the present invention is to prevent tooth skipping from occurring between an input gear and a driving gear due to floating-up of an upper lid when a housing body is set without deteriorating mountability and demountability of the upper lid with respect to the housing body.

Solution to Problem

An optical scanning device according to the present invention includes a box-like housing body that is opened upward and receives an optical element, an upper lid that has a light emitting port extending in a predetermined direction and closes an upper side of the housing body, a transparent cover that covers the light emitting port, a cleaning member that moves in the predetermined direction while abutting an upper surface of the transparent cover, and an input gear that constitutes a part of a movement mechanism that moves the cleaning member in the predetermined direction and is meshed with a driving gear provided in an image forming apparatus body when the housing body is set in a predetermined place of the image forming apparatus body from above.

Furthermore, the upper lid is formed at an end part thereof with a plurality of engagement holes, the housing body is provided at a sidewall thereof with a plurality of upper lid engaging projecting parts that project outward from a housing and are engaged with the engagement holes, the input gear is held to an end part of one side or the other side of the upper lid in the predetermined direction, and the plurality of upper lid engaging projecting parts are formed such that amounts of projecting outward from the housing are increased as the plurality of upper lid engaging projecting parts are positioned at a side near the input gear in the predetermined direction.

Advantageous Effects of Invention

According to the present invention, it is possible to prevent tooth skipping from occurring between an input gear and a driving gear due to floating-up of an upper lid when a housing body is set without deteriorating mountability and demountability of the upper lid with respect to the housing body.

DESCRIPTION OF EMBODIMENTS

Hereinafter, embodiments of the present invention will be described in detail on the basis of the drawings. It is noted that the present invention is not limited to the following embodiments.

Embodiment

Figure 1:
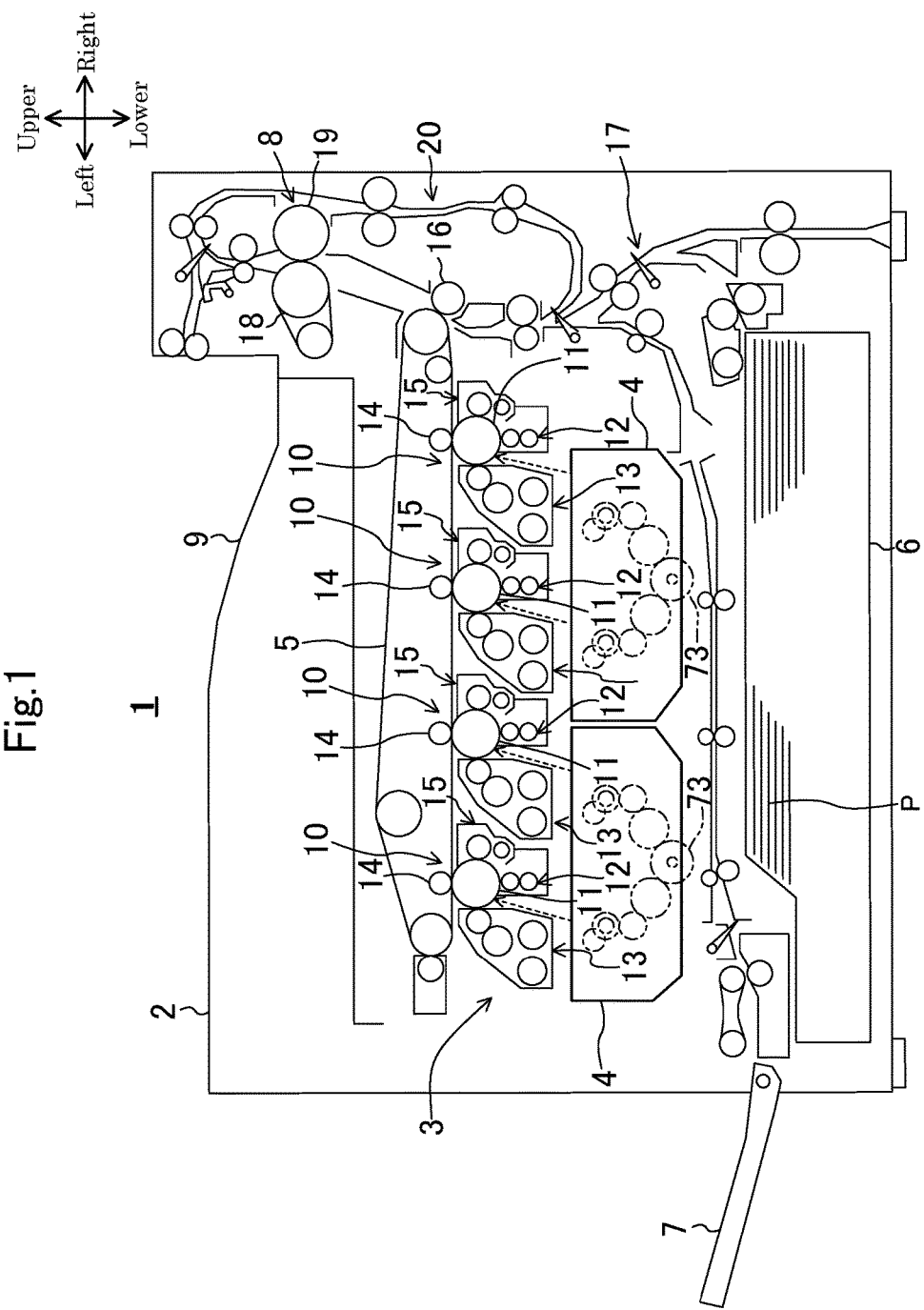
FIG. 1 is an overall view illustrating a schematic configuration of an image forming apparatus in an embodiment.

FIG. 1 illustrates a schematic configuration of an image forming apparatus 1 according to an embodiment of the present invention. In the following description, it is assumed that a front side and a rear side indicate a front side and a rear side of the image forming apparatus 1 (a front side and a back side in a direction vertical to the paper surface of FIG. 1) and a left side and a right side indicate a left side and a right side when the image forming apparatus 1 is viewed from the front side.

The image forming apparatus 1 is a tandem type color printer and has an image forming apparatus body 2 covered by a box-like casing. The image forming apparatus body 2 is provided therein with an image forming unit 3. The image forming unit 3 transfers an image to a recording sheet P and forms the image on the recording sheet P on the basis of image data transmitted from an external device such as a computer subjected to network connection and the like. Below the image forming unit 3, two optical scanning devices 4 are disposed to emit laser beams, and above the image forming unit 3, a transfer belt 5 is disposed. Below the two optical scanning devices 4, a sheet storage unit 6 is disposed to store the recording sheet P, and at the left side of the sheet storage unit 6, a manual sheet feeding unit 7 is disposed. At a right upper side of the transfer belt 5, a fixing unit 8 is disposed to perform a fixing process on the image transferred to and formed on the recording sheet P. A reference numeral 9 indicates a sheet discharge unit disposed at an upper part of the image forming apparatus body 2 to discharge the recording sheet P subjected to the fixing process in the fixing unit 8.

The image forming unit 3 includes four image forming units 10 disposed in a row along the transfer belt 5. Each of the image forming units 10 has a photosensitive drum 11. Directly under each photosensitive drum 11, a charging device 12 is disposed, and at a left side of each photosensitive drum 11, a developing device 13 is disposed. Directly above each photosensitive drum 11, a primary transfer roller 14 is disposed, and at a right side of each photosensitive drum 11, a cleaning unit 15 is disposed to clean the peripheral surface of the photosensitive drum 11.

The peripheral surface of each photosensitive drum 11 is uniformly charged by the charging device 12, and laser beams based on predetermined image data are irradiated to the charged peripheral surface of the photosensitive drum 11 from the two optical scanning devices 4, so that an electrostatic latent image is formed on the peripheral surface of each photosensitive drum 11. A developer is supplied to the electrostatic latent image from the developing device 13, so that a toner image of yellow, magenta, cyan, or black is formed on the peripheral surface of each photosensitive drum 11. These toner images are respectively superposed on and transferred to the transfer belt 5 by a transfer bias applied to the primary transfer roller 14.

A reference numeral 16 indicates a secondary transfer roller disposed below the fixing unit 8 in the state of abutting the transfer belt 5, wherein the recording sheet P conveyed along a sheet conveyance path 17 from the sheet storage unit 6 or the manual sheet feeding unit 7 is interposed between the secondary transfer roller 16 and the transfer belt 5, and the toner images on the transfer belt 5 are transferred to the recording sheet P by a transfer bias applied to the secondary transfer roller 16.

The fixing unit 8 includes a heating roller 18 and a pressure roller 19, wherein the recording sheet P is interposed by the heating roller 18 and the pressure roller 19 so as to be pressed and heated, so that the toner images, which have been transferred to the recording sheet P, are fixed to the recording sheet P. The recording sheet P subjected to the fixing process is discharged to the sheet discharge unit 9. A reference numeral 20 indicates a reversing conveyance path for reversing the recording sheet P discharged from the fixing unit 8 at the time of duplex printing.

Details of Optical Scanning Device

The two optical scanning devices 4 are juxtaposed in a right and left direction. The left optical scanning device 4 is configured to emit laser beams corresponding to a magenta (M) and a cyan (C), and the right optical scanning device 4 is configured to emit laser beams corresponding to a yellow (Y) and a black (K). Since the configurations of the two optical scanning devices 4 are identical to each other, only the configuration of the right optical scanning device 4 will be described and the description of the left optical scanning device 4 will be omitted.

Figure 2:
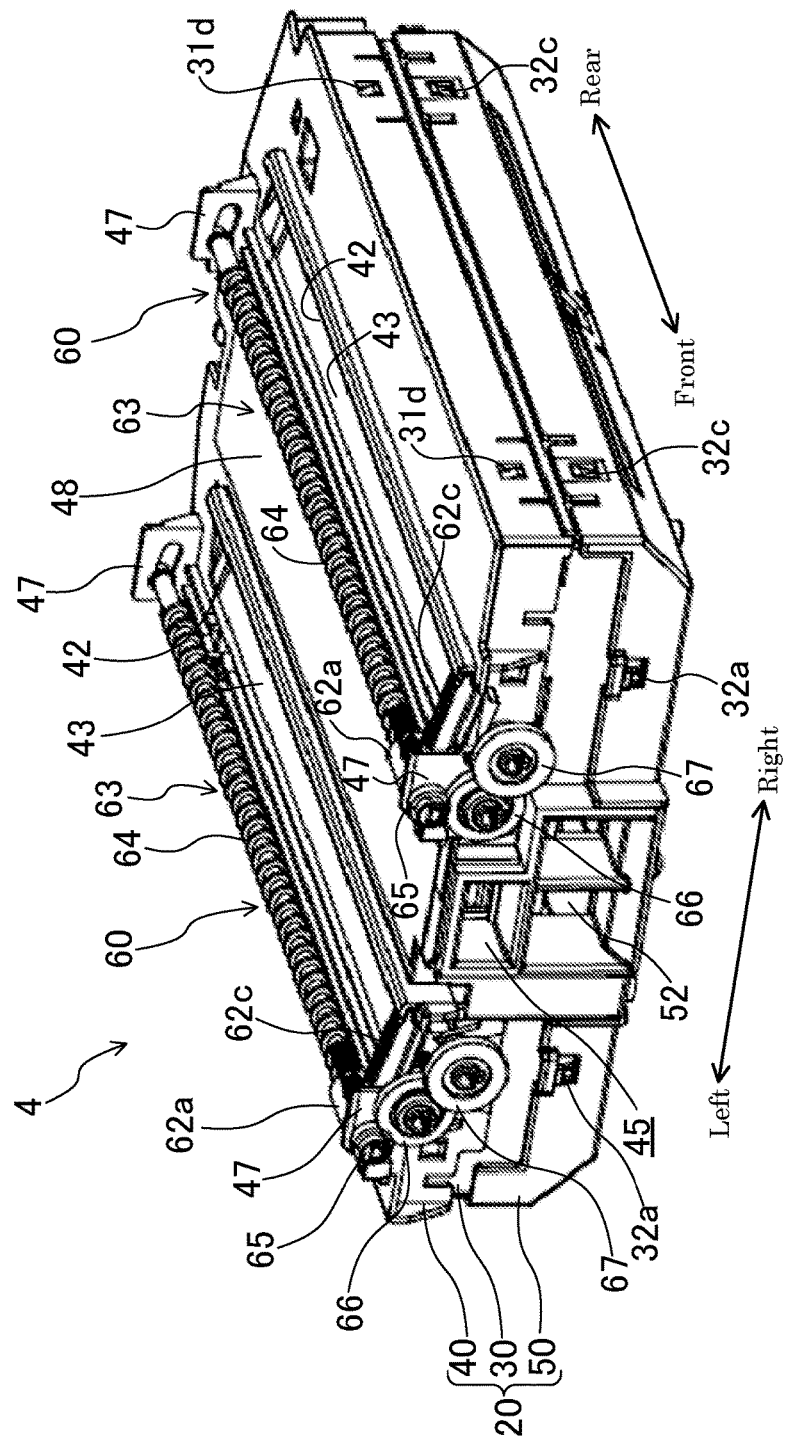
FIG. 2 is a perspective view when an optical scanning device is viewed from a front oblique right side.

As illustrated in FIG. 2, the optical scanning device 4 includes a resinous optical housing 20. The optical housing 20 has a flat sealed box shape. The optical housing 20 is configured with a bottomed box-like housing body 30 opened upward, an upper lid 40 that covers an upper side of the housing body 30, and a lower lid 50 that covers a lower side of the housing body 30. The upper lid 40 is formed with a pair of light emitting ports 42 juxtaposed in the right and left direction. Each light emitting port 42 has a rectangular shape extending in a front and rear direction (a predetermined direction) and is covered by a glass cover 43 as a transparent cover.

The housing body 30 receives a light source that generates a pair of laser beams corresponding to the yellow (Y) and the black (K) (or the magenta (M) and the cyan (C)), a polygon mirror 76 (see FIG. 5) that deflects the laser beams, and an optical element group that forms images of the deflected laser beams on the surface of the photosensitive drum 11. The pair of laser beams emitted from the light source are scanned in a main scanning direction by the polygon mirror 76, are then subjected to the image formation by the optical element group, and are emitted toward the photosensitive drum 11 corresponding to each color from each light emitting port 42 formed in the upper lid 40.

The upper lid 40 is provided on the upper surface thereof with a pair of cleaning mechanisms 60 for automatically cleaning each glass cover 43. Each cleaning mechanism 60 has a cleaning member 61 for cleaning the glass cover 43, a holding member 62 for holding the cleaning member 61 (see FIG. 3), and a movement mechanism 63 that allows the holding member 62 to reciprocally move along the glass cover 43 in the front and rear direction. The movement mechanism 63 has a screw shaft 64 extending along the glass cover 43 in the front and rear direction, and the holding member 62 is engaged with and supported to the screw shaft 64.

Figure 3:
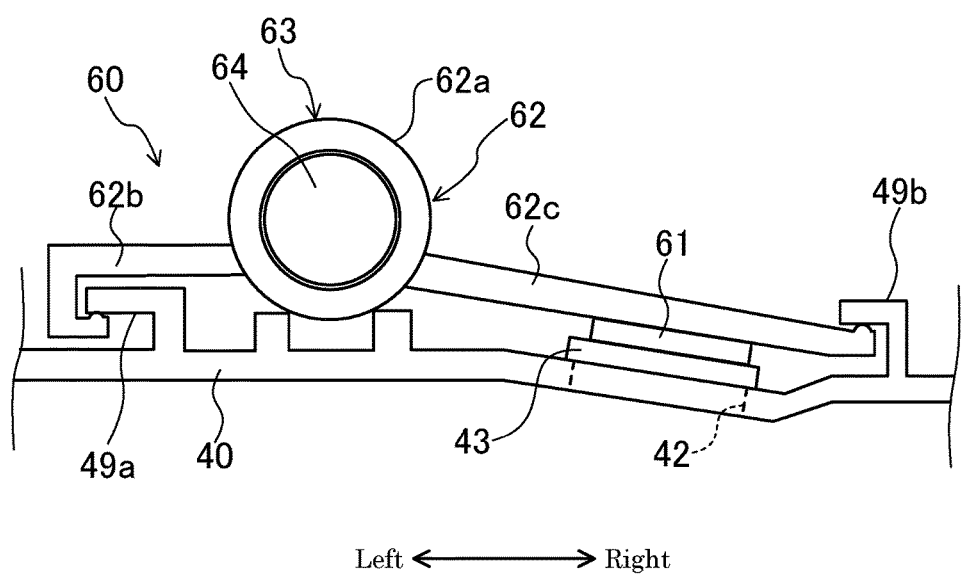
FIG. 3 is a schematic view when a cleaning mechanism is viewed from a shaft direction of a screw shaft.

As illustrated in FIG. 3, the cleaning member 61 includes a blade member that abuts the upper surface of the glass cover 43. The blade member, for example, includes an elastic member such as a silicon pad. The holding member 62 has a cylindrical nut part 62a fitted onto the screw shaft 64, a left arm part 62b extending leftward from a left side of the nut part 62a, and a right arm part 62c extending rightward from a right side of the nut part 62a. A distal end part of the left arm part 62b is engaged with a left rail part 49a that projects from the upper surface of the upper lid 40 and has a sectional L shape. A distal end part of the right arm part 62c is engaged with a right rail part 49b that projects from the upper surface of the upper lid 40 and has a sectional L shape. By so doing, the holding member 62 is movably guided by the right and left rail parts 49a and 49b in the front and rear direction.

The movement mechanism 63 has the screw shaft 64, a driven gear 65, an idle gear 66, and an input gear 67. These gears 65 to 67 are supported to a front end part of the upper lid 40. That is, in the present embodiment, a side at which the gears 65 to 67 are positioned in the upper lid 40 is a front side. The driven gear 65 is integrally and rotatably fixed to a front end part of the screw shaft 64 and is supported to the front end part of the upper lid 40 via the screw shaft 64. The idle gear 66 and the input gear 67 are rotatably held to a front side surface of the upper lid 40 via a shaft member. The idle gear 66 is meshed with the driven gear 65 from a right oblique lower side. The input gear 67 has a small diameter gear part 67a and a large diameter gear part 67b coaxially disposed with each other (see FIG. 4). The small diameter gear part 67a of the input gear 67 is meshed with the idle gear 66 from a right oblique lower side. The large diameter gear part 67b of the input gear 67 is meshed with a driving gear 71 (see FIG. 4) when the optical housing 20 is set in a predetermined place of the image forming apparatus body 2 from above.

Figure 4:
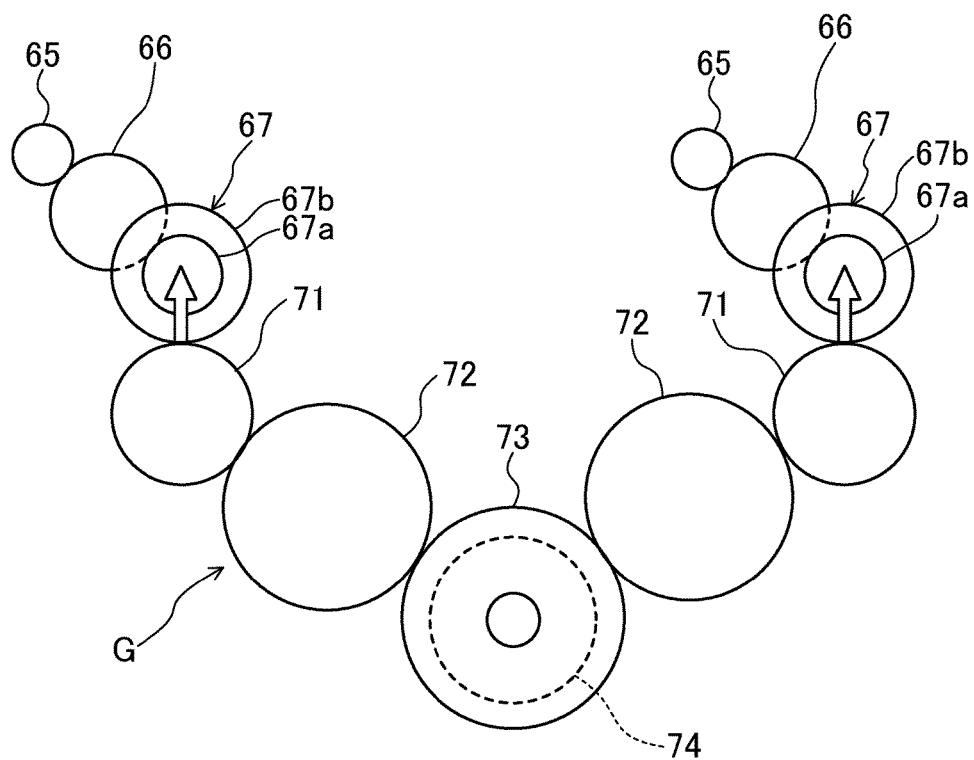
FIG. 4 is a schematic view illustrating a driving gear system of a cleaning mechanism.

As illustrated in FIG. 4, the driving gear 71 constitutes a part of a driving gear train G provided to the front end part of the image forming apparatus body 2. The driving gear 71 is positioned directly under the input gear 67 in the state in which the optical housing 20 has been set in the image forming apparatus body 2. The driving gear 71 may be positioned at an obliquely lower side as well as directly under the input gear 67. The driving gear train G has an idle gear 72 and a motor gear 73 in addition to the driving gear 71. The driving gear 71 and the idle gear 72 are provided to each of the pair of cleaning mechanisms 60 (the movement mechanisms 63), but only one motor gear 73 is commonly provided to the pair of cleaning mechanisms 60. The motor gear 73 is fixed to an output shaft of a motor 74 provided in the image forming apparatus body 2. By so doing, the pair of cleaning mechanisms 60 are driven by the one common motor 74. The motor 74, for example, may serve as a motor for driving a sheet conveying mechanism in the image forming apparatus body 2.

The rotational driving force of the motor 74 is transferred to the driving gear 71 via the motor gear 73 and the idle gear 72. The rotation of the driving gear 71 is transferred to the driven gear 65 via the input gear 67 and the idle gear 66. As a consequence, since the screw shaft 64 is rotated together with the driven gear 65, the holding member 62 engaged with and supported to the screw shaft 64 is linearly moved in the front and rear direction. In this way, the cleaning member 61 held to the holding member 62 is moved in the front and rear direction while abutting the upper surface of the glass cover 43, so that the upper surface of the glass cover 43 is cleaned.

Figure 5:
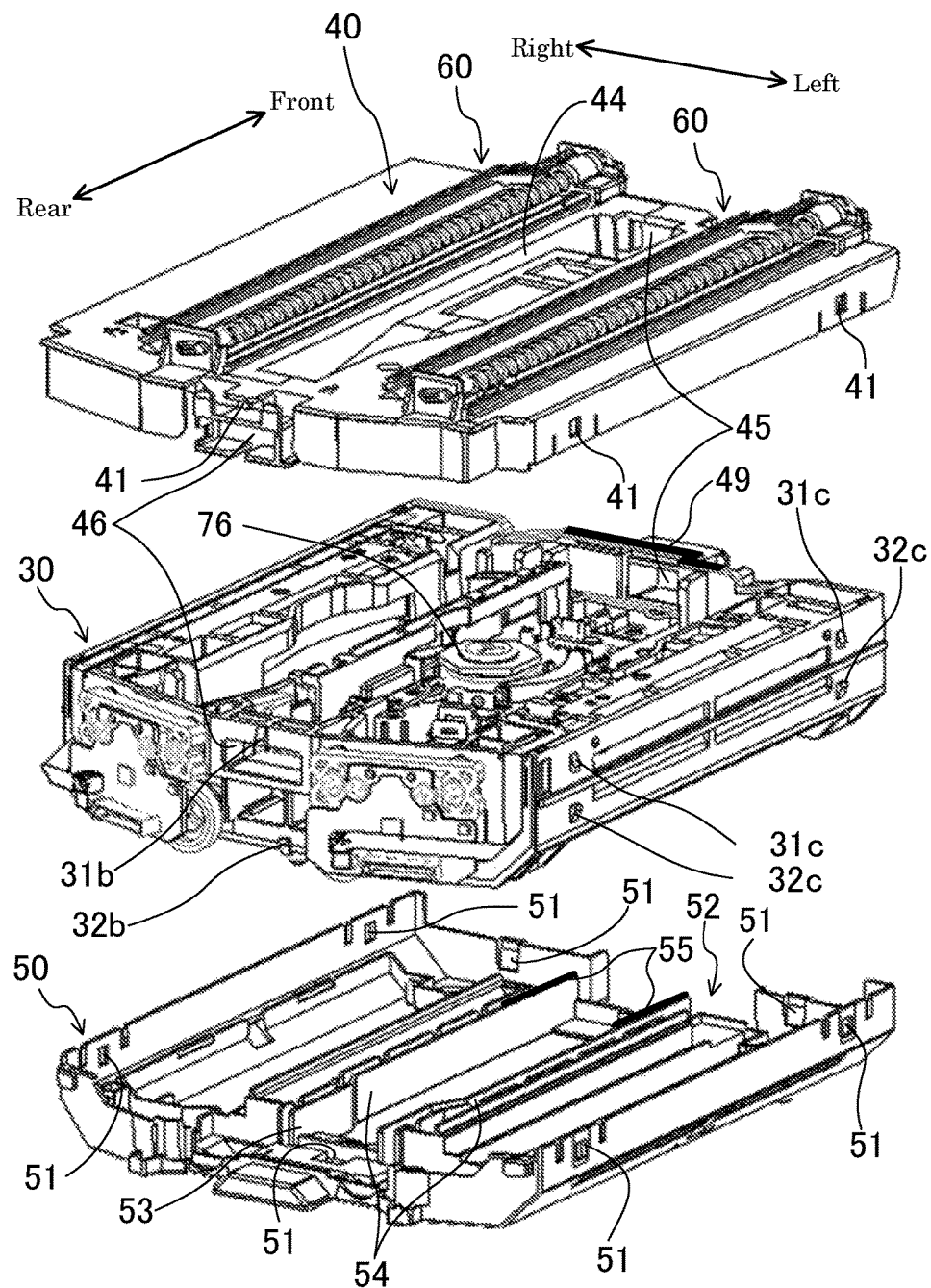
FIG. 5 is an exploded perspective view illustrating a state in which an upper lid and a lower lid have been detached from a housing body.
Figure 6:
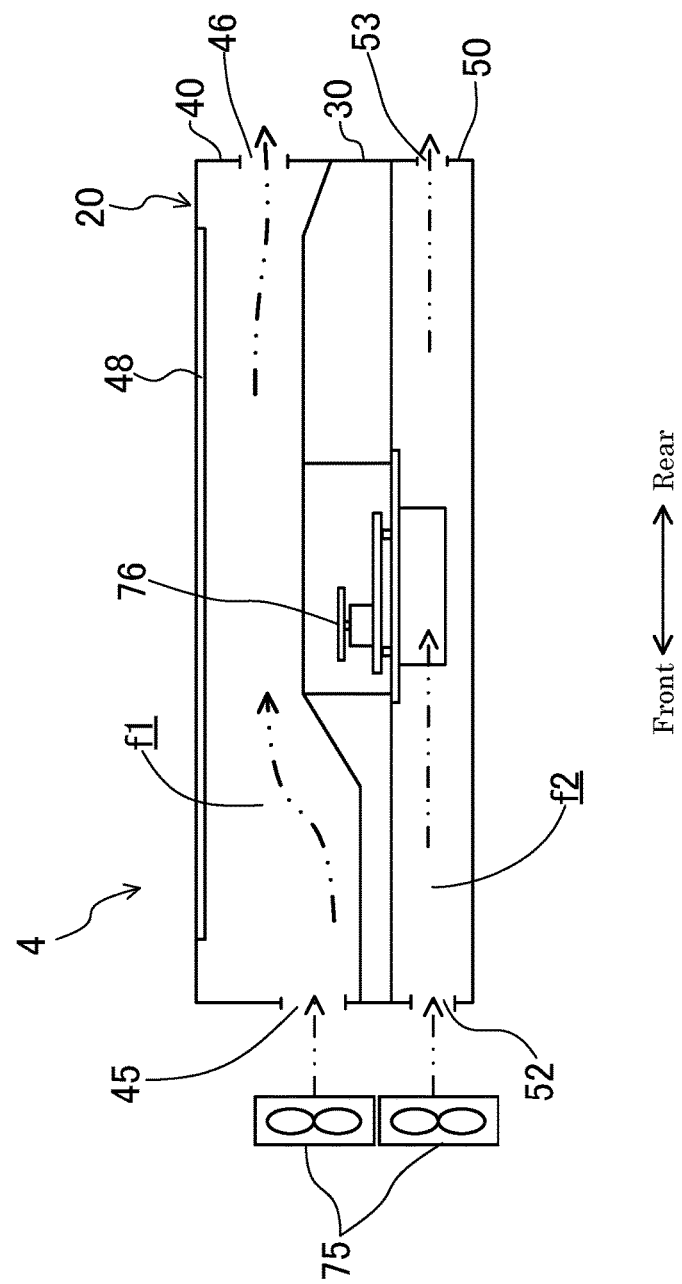
FIG. 6 is a schematic view illustrating a cooling structure of an optical scanning device.

FIG. 5 is an exploded perspective view illustrating a state in which the upper lid 40 and the lower lid 50 have been detached from the housing body 30. The upper lid 40 has a flat rectangular box shape opened downward. At the center part of the upper surface of the upper lid 40 in the right and left direction, a concave part 44 is formed to extend over about the whole in the front and rear direction. An upper opening of the concave part 44 is closed by a plate-like passage cover 48 (see FIG. 6) extending in the front and rear direction. By the passage cover 48 and an inner wall surface of the concave part 44, an upper air passage f1 is formed to extend in the front and rear direction. The upper air passage f1 communicates with a space in the image forming apparatus body 2 through an air supply port 45 and an exhaust port 46. In the present embodiment, the air supply port 45 side is the front side and the exhaust port 46 side is the rear side. The air supply port 45 passes through a front sidewall of the upper lid 40 and a front sidewall of the housing body 30. The air supply port 45 is connected to an air blowing fan 75 through a duct (not illustrated) and an upper surface part of the housing body 30 is cooled by airflow supplied into the upper air passage f1 from the air blowing fan 75. A seal member 49 (see FIG. 5) is disposed at a surface of the housing body 30, which faces the upper lid 40 at an end part of the air supply port 45 side. The seal member 49, for example, is configured by an elastic member such as rubber. The seal member 49 is disposed in a state of being interposed between the housing body 30 and the upper lid 40 and being compressed. As described above, when the seal member 49 is provided, air leakage is prevented in the vicinity of the air supply port 45.

The lower lid 50 has a flat rectangular box shape opened upward, and at the center part of a bottom wall of the lower lid 50 in the right and left direction, a pair of longitudinal walls 54 are provided to extend in the front and rear direction. The pair of longitudinal walls 54 are disposed spaced apart from each other in the right and left direction. By the pair of longitudinal walls 54, the bottom wall of the lower lid 50, and a bottom wall of the housing body 30, a lower air passage f2 (see FIG. 6) is formed to extend in the front and rear direction. The lower air passage f2 communicates with a space in the image forming apparatus body 2 through an air supply port 52 and an exhaust port 53. The air supply port 52 passes through the front sidewall of the lower lid 50 and the front sidewall of the housing body 30. The air supply port 52 is connected to the air blowing fan 75 through a duct (not illustrated) and a lower surface part of the housing body 30 is cooled by airflow supplied into the lower air passage f2 from the air blowing fan 75. Seal members 55 are disposed at a surface of an end part of the air supply port 52 side in the lower lid 50, which faces the housing body 30. Specifically, the seal members 55 are disposed at the end part of the air supply port 52 side on the upper end surfaces of the pair of longitudinal walls 54. The seal members 55 are disposed in a state of being interposed between the lower lid 50 and the housing body 30 and being compressed, so that air leakage is prevented in the vicinity of the air supply port 52.

Figure 7:
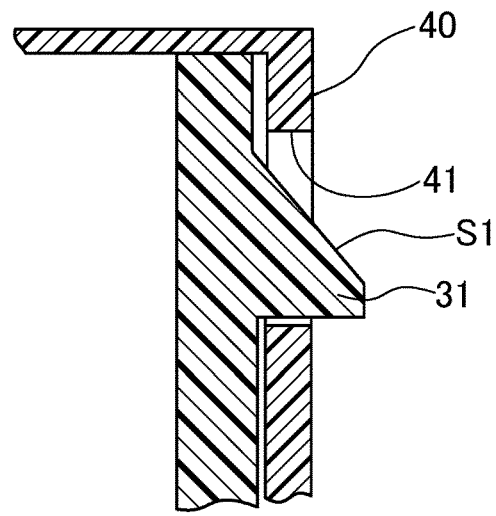
FIG. 7 is a schematic sectional view illustrating a state in which upper lid engaging projecting parts formed at a housing body and engagement holes formed in an upper lid have been engaged with each other.
Figure 8:
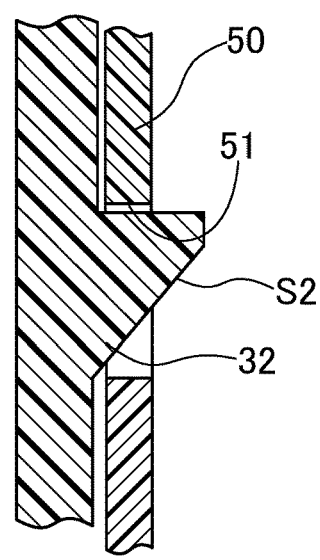
FIG. 8 is a schematic sectional view illustrating a state in which lower lid engaging projecting parts formed at a housing body and an engagement holes formed in a lower lid have been engaged with each other.

Next, a connection structure of the upper lid 40 and the lower lid 50 with respect to the housing body 30 will be described. The housing body 30 is provided at the sidewall thereof with a plurality of upper lid engaging projecting parts 31 (see FIG. 7) and a plurality of lower lid engaging projecting parts 32 (see FIG. 8), which project outward from the housing. The upper lid 40 is formed at the sidewall thereof with a plurality of engagement holes 41 engaged with the upper lid engaging projecting parts 31, and the lower lid 50 is formed at the sidewall thereof with a plurality of engagement holes 51 engaged with the lower lid engaging projecting parts 32.

The upper lid engaging projecting part 31 has a trapezoidal column shape with an inclined surface 51. The inclined surface 51 is formed to be widened outward from the housing as it goes downward. When the upper lid 40 is mounted at the housing body 30 from above, the lower end of the sidewall of the upper lid 40 is elastically deformed while sliding along the inclined surface 51, and the upper lid engaging projecting parts 31 reach the engagement holes 41, so that the elastically deformed sidewall is returned to the original shape and thus the upper lid engaging projecting parts 31 and the engagement holes 41 are engaged with each other.

The lower lid engaging projecting parts 32 has a trapezoidal column shape with an inclined surface S2. The inclined surface S2 is formed to be widened outward from the housing as it goes upward. When the lower lid 50 is mounted at the housing body 30 from below, the upper end of the sidewall of the lower lid 50 is elastically deformed while sliding along the inclined surface S2, and the lower lid engaging projecting parts 32 reach the engagement holes 51, so that the elastically deformed sidewall is returned to the original shape and thus the lower lid engaging projecting parts 32 and the engagement holes 51 are engaged with each other.

Figure 9:
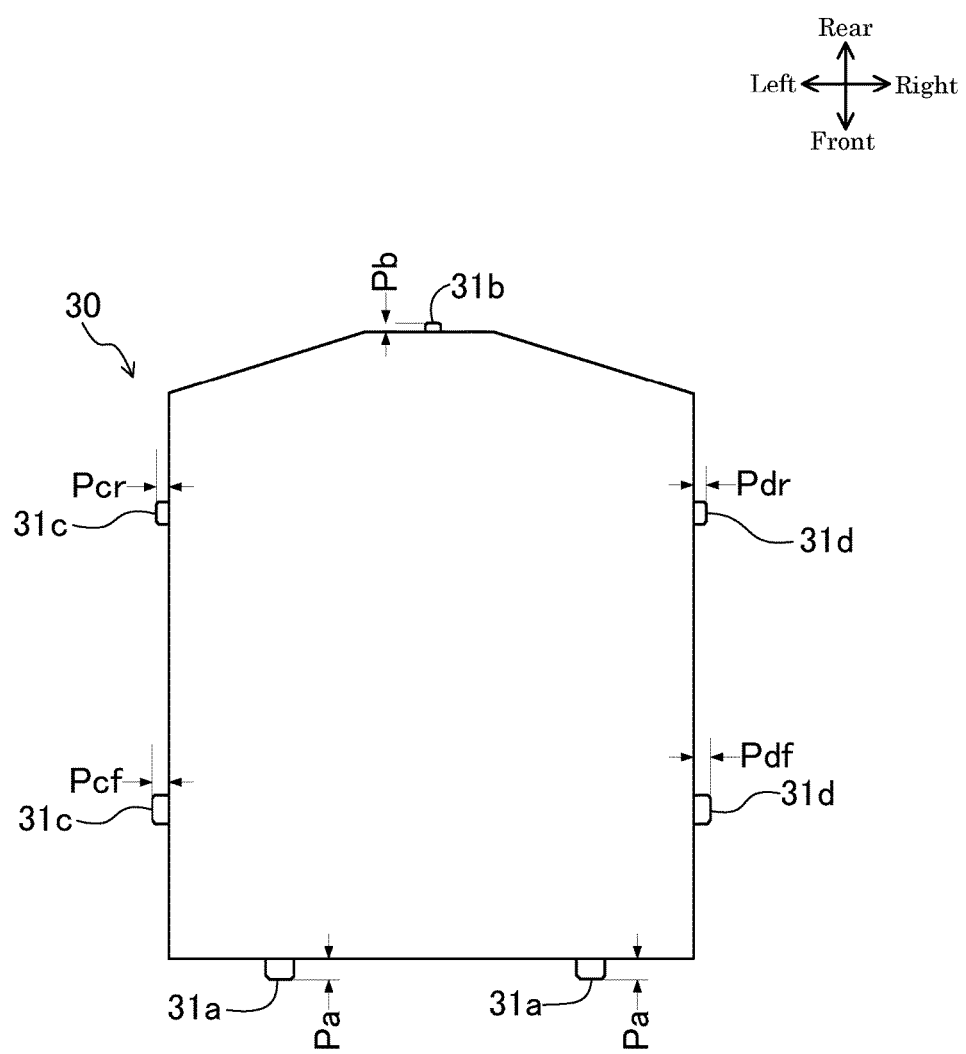
FIG. 9 is a schematic view for explaining an arrangement configuration and projecting amounts of upper lid engaging projecting parts formed at a housing body.

As illustrated in FIG. 9, the total number of provided upper lid engaging projecting parts 31 is 7. Specifically, the seven upper lid engaging projecting parts 31 include two front engaging projecting parts 31a formed at the front wall of the housing body 30, one rear engaging projecting part 31b formed at the rear wall, two left engaging projecting parts 31c formed at the left wall, and two right engaging projecting parts 31d formed at the right wall. The two front engaging projecting parts 31a are symmetrically disposed while interposing the center position of the outer side surface of the front wall of the housing body 30 in the right and left direction. The rear engaging projecting part 31b is disposed at the center of the outer side surface of the rear wall of the housing body 30 in the right and left direction. The two left engaging projecting parts 31c are disposed on the outer side surface of the left wall of the housing body 30 while being spaced apart from each other in the front and rear direction. The two right engaging projecting parts 31d are disposed on the outer side surface of the right wall of the housing body 30 while being spaced apart from each other in the front and rear direction. The two right engaging projecting parts 31d are formed at the same positions as those of the two left engaging projecting parts 31c in the front and rear direction.

When the projecting amount of the front engaging projecting part 31a is set as Pa, the projecting amount of the rear engaging projecting part 31b is set as Pb, the projecting amount of the front engaging projecting part of the two left engaging projecting parts 31c is set as Pcf, the projecting amount of the rear engaging projecting part of the two left engaging projecting parts 31c is set as Pcr, the projecting amount of the front engaging projecting part of the two right engaging projecting parts 31d is set as Pdf, and the projecting amount of the rear engaging projecting part of the two right engaging projecting parts 31d is set as Pdr, relations of Pa>Pcf>Pcr>Pb and Pa>Pdf>Pdr>Pb are satisfied. That is, the projecting amounts of the upper lid engaging projecting parts 31 are increased as they are positioned at the front side (that is, as it goes toward the side at which the input gear 67 is positioned). Furthermore, in the present embodiment, relations of Pcf=Pdf and Pcr=Pdr are satisfied.

Figure 10:
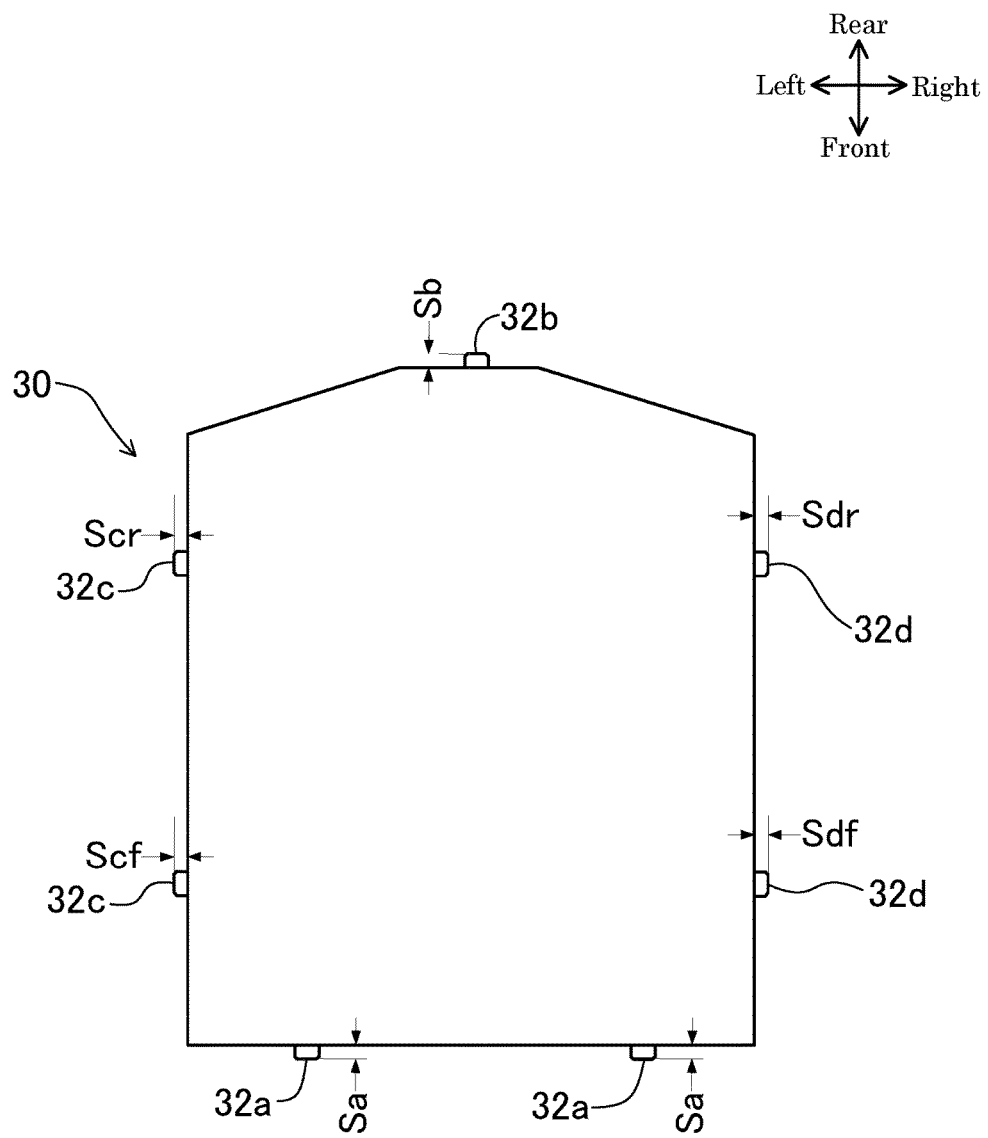
FIG. 10 is a schematic view for explaining an arrangement configuration and projecting amounts of lower lid engaging projecting parts formed at a housing body.

As illustrated in FIG. 10, the total number of provided lower lid engaging projecting parts 32 is 7. Specifically, the seven lower lid engaging projecting parts 32 include two front engaging projecting parts 32a formed at the front wall of the housing body 30, one rear engaging projecting part 32b formed at the rear wall, two left engaging projecting parts 32c formed at the left wall, and two right engaging projecting parts 32d formed at the right wall. The engaging projecting parts 32a to 32d, which are the lower lid engaging projecting parts 32, are positioned below the engaging projecting parts 31a to 31d which are the upper lid engaging projecting parts 31, and are disposed at the same positions as those of the engaging projecting parts 31a to 31d in the plan view.

When the projecting amount of the front engaging projecting part 32a is set as Sa, the projecting amount of the rear engaging projecting part 32b is set as Sb, the projecting amount of the front engaging projecting part of the two left engaging projecting parts 32c is set as Scf, the projecting amount of the rear engaging projecting part of the two left engaging projecting parts 32c is set as Scr, the projecting amount of the front engaging projecting part of the two right engaging projecting parts 32d is set as Sdf, and the projecting amount of the rear engaging projecting part of the two right engaging projecting parts 32d is set as Sdr, a relation of Sa=Scf=Scr=Sb and Sa=Sdf=Sdr=Sb is satisfied. That is, the projecting amounts of the lower lid engaging projecting parts 32 are constant regardless of positions in the front and rear direction. Preferably, the projecting amount, for example, is set as an average value (=(Pa+Pb)/2) of the projecting amount Pa of the front engaging projecting part 31a and the projecting amount Pb of the rear engaging projecting part 31b of the upper lid engaging projecting parts 31.

When the optical scanning device 4 configured as above is assembled with the image forming apparatus body 2, the optical housing 20 is set in a predetermined place of the image forming apparatus body 2 from above. Accordingly, the driving gear 71 is meshed with the input gear 67, which is held to the upper lid 40 of the optical housing 20, from below (see FIG. 4). In this case, since the upper lid 40 slightly floats up by pressing force (see the white arrow of FIG. 4) acting on the input gear 67 from the driving gear 71, tooth skipping may occur between the input gear 67 and the driving gear 71. In this regard, it is considered to increase the projecting amounts of the upper lid engaging projecting parts 31 formed at the housing body 30 in order to prevent the floating-up of the upper lid 40. However, when the projecting amounts of the upper lid engaging projecting parts 31 are simply increased, mountability and demountability of the upper lid 40 with respect to the housing body 30 may be deteriorated.

In order to solve the problem, in the present embodiment, the seven upper lid engaging projecting parts 31 are formed such that their projecting amounts are increased as they are positioned at a side (a front side) near the input gear 67 in the front and rear direction. In this way, it is possible to sufficiently ensure connecting force of the upper lid 40 with the housing body 30 at an end part of the input gear 67 side and to prevent the connecting force of the upper lid 40 with the housing body 30 from being unnecessarily increased at a side (a rear side) opposite to the input gear 67 side. Thus, it is possible to reliably prevent the floating-up of the upper lid 40 when the optical housing 20 is set without deteriorating the mountability and demountability of the upper lid 40 with respect to the housing body 30.

In the optical scanning device 4 of the aforementioned embodiment, the seal member 49 is disposed at a surface of the housing body 30, which faces the upper lid 40 at an end part of the air supply port 45 side. Therefore, since repulsive force always acts on the upper lid 40 from the seal member 49, the aforementioned floating-up of the upper lid 40 easily occurs as compared with a case where the seal member 49 is not provided. The configuration (that is, the configuration in which the projecting amount is increased in the upper lid engaging projecting parts 31 positioned at a side near the input gear 67) of the present invention is particularly available for the optical scanning device 4 having such a seal structure.

Other Embodiments

In the aforementioned embodiment, an example, in which the input gear 67 is held to the front sidewall (the front end part) of the upper lid 40 via the shaft member, has been described; however, the present invention is not limited thereto. That is, the input gear 67, for example, may be integrally and rotatably fixed to the screw shaft 64. In this case, the input gear 67 is held to the front end part of the upper lid 40 via the screw shaft 64.

Furthermore, in the aforementioned embodiment, an example, in which the input gear 67 is held to the front end part of the upper lid 40, has been described; however, the present invention is not limited thereto and the input gear 67 may be held to the rear end part of the upper lid 40.

Furthermore, in the aforementioned embodiment, an example, in which the image forming apparatus 1 is a laser printer, has been described; however, the present invention is not limited thereto and the image forming apparatus 1 may be a copy machine, a multifunctional peripheral (MFP), a facsimile and the like.

INDUSTRIAL APPLICABILITY

As described above, the present invention is available for an optical scanning device and an image forming apparatus including the same.

The invention claimed is:

1. An optical scanning device comprising:
   a box-like housing body that is opened upward and receives an optical element;
   an upper lid that has a light emitting port extending in a predetermined direction and closes an upper side of the housing body;
   a transparent cover that covers the light emitting port;
   a cleaning member that moves in the predetermined direction while abutting an upper surface of the transparent cover; and
   an input gear that constitutes a part of a movement mechanism that moves the cleaning member in the predetermined direction and is meshed with a driving gear provided in an image forming apparatus body when the housing body is set in a predetermined place of the image forming apparatus body from above,
   wherein the upper lid is formed at an end part thereof with a plurality of engagement holes,
   the housing body is provided at a sidewall thereof with a plurality of upper lid engaging projecting parts that project outward from a housing and are engaged with the engagement holes,
   the input gear is held to an end part of one side or the other side of the upper lid in the predetermined direction, and
   the plurality of upper lid engaging projecting parts are formed such that amounts of projecting outward from the housing are increased as the plurality of upper lid engaging projecting parts are positioned at a side near the input gear in the predetermined direction.

2. The optical scanning device of claim 1, wherein at a wall of the housing body near the input gear in the predetermined direction, an air supply port is formed to supply air into the housing body, and
   a seal member is disposed at a surface of the housing body, which faces the upper lid at an end part of a side of the air supply port, is configured by an elastic member, and is disposed in a state of being interposed between the housing body and the upper lid and being compressed.

3. An image forming apparatus comprising the optical scanning device of claim 1.

* * * * *